United States Patent [19]

Neighbor et al.

[11] 4,224,860

[45] Sep. 30, 1980

[54] DIAPHRAGM ASSEMBLY

[75] Inventors: Larry Neighbor, Howell; George Roche, Flint, both of Mich.

[73] Assignee: BLD Products, Ltd., Flint, Mich.

[21] Appl. No.: 930,691

[22] Filed: Aug. 3, 1978

[51] Int. Cl.³ .......................... F01B 19/00; F16J 3/02
[52] U.S. Cl. ........................................ 92/100; 92/101
[58] Field of Search ............... 92/99, 100, 101, 260, 92/231; 29/454; 156/73.1

[56] References Cited

U.S. PATENT DOCUMENTS

| | | | |
|---|---|---|---|
| 3,082,792 | 3/1963 | Jenkins | 92/101 X |
| 3,155,015 | 11/1964 | Genz | 92/249 |
| 3,545,070 | 12/1970 | Bauer | 92/100 X |
| 3,711,226 | 1/1973 | Kreuter | 156/73.1 X |

*Primary Examiner*—Irwin C. Cohen
*Attorney, Agent, or Firm*—Fisher, Gerhardt, Crampton & Groh

[57] ABSTRACT

A diaphragm assembly for servo motors has been provided wherein a pair of backing elements have opposed portions acting on opposite sides of a diaphragm assembly and are held in fixed relationship to each other through the means of a sonic weld located at a point remote from the diaphragm to provide a leak-proof diaphragm assembly which lends itself to ready modification to accept valves or diaphragms to change the operating characteristics for different applications.

3 Claims, 5 Drawing Figures

DIAPHRAGM ASSEMBLY

This invention relates to vacuum motors and more particularly to a diaphragm assembly for such motors.

In the automotive field alone a large variety of small vacuum motors are used for various controls such as heater and air conditioning vents and choke controls for the carburetor of internal combustion engines, for example.

Each of such vacuum motors is slightly different for its different applications with some employing control valves, delay valves, filters or spring loaded lost motion devices or any combination of such elements as a consequence of which the structures of the servo motors vary substantially from each other to accommodate such elements. Also typically such vacuum motors employ a diaphragm between stamped metal plates which are fastened together in a variety of ways but which usually are subject to leakage.

It is the object of this invention to provide a diaphragm assembly for vacuum motors in which the same assembly is easily modified to accept various forms of filters, output members, valves and the like.

Another object of the invention is to provide a diaphragm assembly for vacuum motors wherein the diaphragm and backing elements form an assembly resisting leakage.

Still another object of the invention is to provide a diaphragm assembly for servo motors in which the assembly is easily modified to receive valves, filters and output members of a variety of configurations.

A further object of the invention is to provide a diaphragm assembly in which the diaphragm and backing elements are fused together by sonic welding at a point remote from the diaphragm.

The objects of the invention are accomplished by a servo motor having a housing in which a diaphragm assembly is disposed to divide the housing into a pair of chambers. The diaphragm assembly includes a pair of backing elements disposed at opposite sides of the diaphragm with one of the backing elements having a portion protruding through the diaphragm and the other of the backing elements having an axially extending portion forming a recess slidably receiving the protruding portion. The backing elements have opposed flanges that sealingly engage oppositely facing annular portions surrounding the opening in the diaphragm and the backing elements are held rigidly relative to each other by being fused together at a point spaced from the diaphragm in a manner such that the heat required for fusion does not affect the diaphragm and the flanges are maintained in sealing engagement with the opposed annular portions of the diaphragm.

These and other objects of the invention will be apparent from the following description and from the drawings in which.

Figure 2:
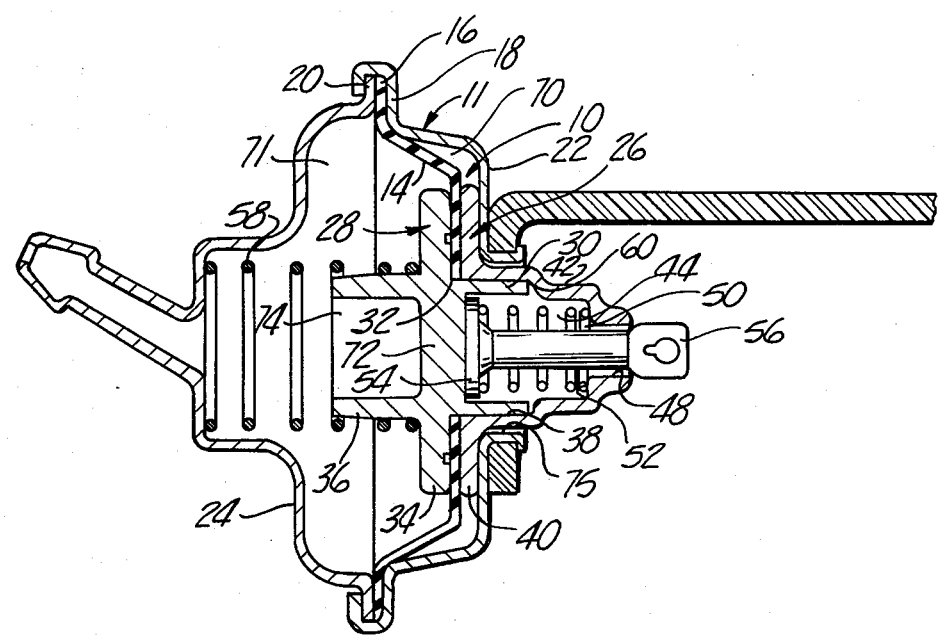
FIG. 2 is a cross sectional view of the servo motor at an enlarged scale taken on line 2—2 in FIG. 1.

The diaphragm assembly embodying the invention is designated generally at 10 and is disposed within a servo motor 11 having a housing 12. As seen in FIG. 2, the diaphragm assembly 10 includes a diaphragm 14 having an outer annular flange 16 clamped in sealing relationship to flanges 18 and 20 of cup shaped front and rear housing covers or members 22 and 24, respectively.

In addition to the diaphragm 14, the diaphragm assembly 10 includes a pair of backing elements 26 and 28 which are made of plastic material and are disposed at opposite sides of the diaphragm 14. The backing element 28 has a generally tubular portion 30 which protrudes through an opening 32 in the diaphragm 14. Extending radially outwardly form the tubular portion 30 is a flange 34 which engages one side face of the diaphragm 14. An annular wall 36 is formed coaxially with the tubular portion 30 and extends in an opposite direction away from the flange 34.

The tubular portion 30 which protrudes through the diaphragm 14 is received in a stepped bore 38 formed in the front backing element 26. The front backing element 26 is made of the same plastic material as the rear backing element 28 and has a flange 40 coextensive with and at the opposite side of the diaphragm from the flange 34. An auxiliary housing portion 42 extends axially to one side of the flange 34 and a portion of the bore 38 formed therein acts with the interior of the tubular portion 30 to form a recess 44 which slidably receives an output member or stem 46. The stem 46 protrudes through an opening 48 in one end of the axially extending portion 42. A spring 50 is disposed in the recess 44 and has one of its ends acting against a shoulder 52 and its other end acting against an annular stop member 54 formed integrally with one end of the stem 46. The spring 50 acts to urge the stem 46 to the right as viewed in FIG. 2. The exterior end 56 of the stem 46 protruding from the axially extending portion 42 is adapted to be connected to various controls.

The annular wall 36 forming part of the rear backing element 28 acts as a guide for a spring 58 having one end reacting against the wall of the rear housing cover 24 and the other end acting against the flange 34.

Figure 3:
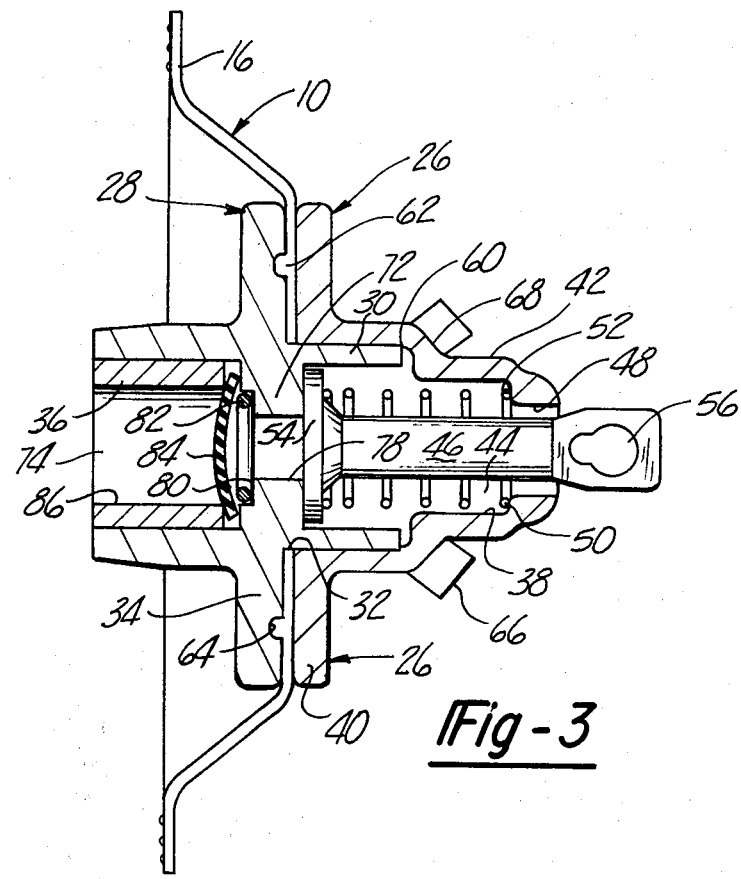
FIG. 3 is a cross sectional view of a modification of a diaphragm assembly at an enlarged scale and diagrammatically illustrating the position of sonic welding equipment.

The opposed flanges 34 and 40 at opposite sides of the diaphragm 14 are held in sealing engagement with the diaphragm by fusing the forward and rearward backing elements 26 and 28 by sonic welding at an annular contact line indicated at 60. This serves to hold the backing elements 26 and 28 permanently connected to each other without requiring any additional openings or the like in the diaphragm. Sealing is further enhanced by an annular rib 62 formed in the diaphragm 14 which fits into a complementary groove 64 formed in the flange 34. Fusion at the contact line 60 is accomplished by sonic welding by positioning a sonic welding head 66 as seen in FIG. 3 at the inclined portion 68 of the axially extending portion 42. The sonic waves are directed through the plastic material forming the forward backing element 26 and causes a permanent bond to be made between the tubular portion 30 and the internal wall of the step bore 38 of the forward backing element 26. During such sonic welding temperatures to the order of 400° F. are generated which normally would melt the exterior surfaces of the plastic parts forming the forward backing element 26. However, in the present instance the plastic material includes filaments of fiberglass uniformly distributed throughout the plastic. The fiberglass elements not only add to the strength and rigidity of the parts but also act to convey heat from the exterior surface to the interior surface of the axially extending housing portion 42 so that a proper fusion or bond can be formed at the annular contact line 60.

Figure 1:
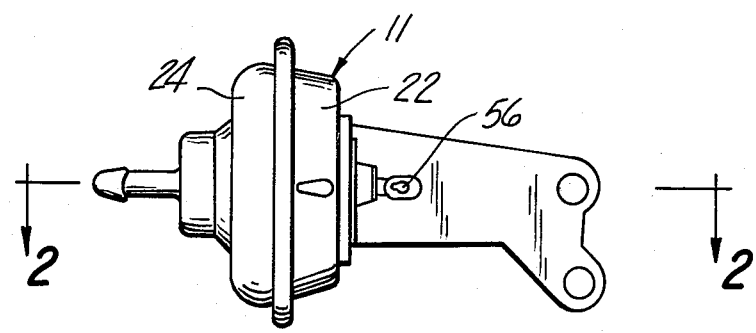
FIG. 1 is a side elevation of a servo motor of the type using a diaphragm assembly embodying the invention.

In the servo motor 11 just described, the diaphragm assembly 10 divides the housing 12 into forward and rearward chambers 70 and 71, respectively. A wall 72 is formed between the recess 44 and a cavity 74 defined by the annular wall 36. Admission of vacuum pressure to the chamber 71 formed at one side of the diaphragm 14 results in movement of the diaphragm assembly 10 to the left as viewed in FIG. 1 because of atmospheric pressure which is maintained constantly in chamber 70 through opening 75. The resultant differential pressure on diaphragm assembly 10 moves it to the left moving with it any links or other instrumentalities connected to the end 56 of the stem 46. If the load of the instrumentality exceeds the force exerted by the spring 50 the spring 50 will first compress permitting the stem 46 to move in the recess 44 to provide a lost motion connection. The compression spring 50 can be selected of a size to provide the desired opposition for a variety of loads depending on the application for the servo motor 11.

Referring now to FIG. 3 a modification of the invention is shown in which a valve assembly 76 is disposed to control passage of fluid pressure between the chambers 70 and 71 at opposite sides of the diaphragm 14 and through the wall 72. In this instance an opening 78 is formed in the wall 72. The opening 78 is surrounded by an annular shoulder or recess 80 which acts as a seat for an O-ring 82. The O-ring 82 and annular recess 80 are covered by a temperature responsive bi-metallic element of concavo-convex formation designated generally at 84. The disc 84 is held in position by a tubular element 86 pressed into the recess 74 to limit outward movement of the disc 84. The temperature responsive disc 84 is such that at lower temperatures the disc retains the shape illustrated in the drawings. Under such conditions fluid exchange through the opening 78 between the chambers is relatively unrestricted. As the temperature increases the disc 84 tends to assume a flat configuration which brings it into contact with the O-ring 82 and obstructs the free passage of air between the chambers. As a result the application of vacuum to the left chamber 71 at low temperatures permits vacuum communication with the other chamber 70 and to the atmosphere through the opening 48 around the axial extending portion 42. When temperature increases, such interchange of fluid is interrupted and the establishment of vacuum in the chamber 71 to the left of the diaphragm 14 causes movement of the diaphragm assembly 10 to the left pulling with it the stem 46.

Figure 4:
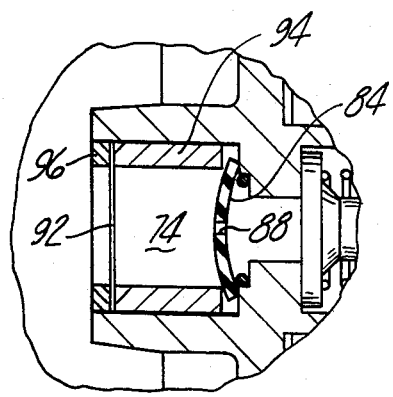
FIG. 4 is a modification of a valve arrangement seen in FIG. 3.

Referring now to FIG. 4, a further modification of the invention is shown in which the disc 84 is provided with a restricted opening or bleed orifice 88. When provided with this element and after the temperature is elevated to a predetermined level, the servo motor 11 permits relatively instantaneously actuation of the diaphragm assembly to move it to the left. However, as air passes through the bleed orifice 88 from the recess 74 to the recess 44 and the fluid pressures in the two recesses become equalized, the diaphragm assembly 10 returns to the right to resume its normal position. This permits the device to be operated with a delay which can be of utility in controlling carburetors in which it may be desirable to delay operation of a control until engine temperature of a selected degree is achieved. Bi-metal discs 84 commercially available in a wide variety of sizes and temperature responsive levels so that the desired operation and delay may be easily selected.

Figure 5:
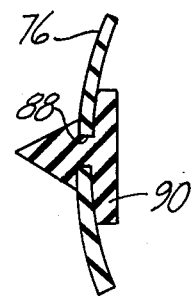
FIG. 5 is a further modification of the valve arrangement seen in FIGS. 3 and 4.

If desired, the orifice 88 of the disc element 84 can be fitted with a plug 90 as seen in FIG. 5. In that case, the servo motor 11 will operate in the same manner as the arrangement illustrated in FIG. 3.

As seen in FIG. 4, it is possible to provide the cavity 74 with a filter element 92 held between a tubular valve retainer 94 and a ring 96 both press fit into the bore of the cavity 74. The filter 92 prevents dust or particles of material from reaching the valve surfaces and orifices to insure proper operation.

A diaphragm assembly for servo motors has been provided wherein a pair of backing elements have opposed portions acting on opposite sides of a diaphragm assembly and are held in fixed relationship relative to each other through the means of sonic welding to provide a leak-proof diaphragm assembly. The backing elements are formed of a plastic material which contains uniformly distributed filaments of fiberglass acting to distribute heat from the surface of the plastic elements to the interior at a point where the surfaces of the pair of backing elements are adjacent to each other and form a point of fusion. The diaphragm assembly lends itself to ready modification to accept valves or diaphragms to change the operating characteristics for different applications.

The embodiments of the invention in which an exclusive property or privilege is claimed are defined as follows:

1. A pressure operated servomotor comprising; a housing, diaphragm disposed in said housing and dividing it into a pair of chambers, a pair of backing elements disposed in said chambers, respectively, at opposite sides of said diaphragm, one backing element having a portion protruding through said diaphragm, the other element of said pair of elements having an axially extending portion forming a recess receiving said protruding portion, said protruding portion and axially extending portion contacting each other at a point remote from said diaphragm, said backing elements having opposed flanges sealingly engaging oppositely facing annular portions surrounding said opening, said elements being made of plastic material containing a random distribution of glass fibers, said fibers being operative to convey heat from the surface of said axially extending portion to said protruding portion to said point remote from said diaphragm, said elements being sonically welded together at said point remote from said diaphragm to effect a sonic weld to maintain said flanges in fixed relationship and sealing engagement with said annular portions.

2. The combination of claim 1 wherein said portion protruding through said diaphragm forms a chamber, a stem disposed in said chamber and slidably protruding through an open end in said protruding portion, and spring means urging said stem in one direction toward said diaphragm.

3. The combination of claim 1 wherein said one element has a portion extending oppositely from said protruding portion to form a spring guide cooperating with a spring.

* * * * *